United States Patent
Kitaji

(10) Patent No.: US 8,346,258 B2
(45) Date of Patent: *Jan. 1, 2013

(54) COMMUNICATION SYSTEM, THRESHOLD MANAGEMENT SERVER, RADIO COMMUNICATION DEVICE, AND COMMUNICATION METHOD

(75) Inventor: Mitsuhiro Kitaji, Yokohama (JP)

(73) Assignee: Kyocera Corporation, Kyoto (JP)

( * ) Notice: Subject to any disclaimer, the term of this patent is extended or adjusted under 35 U.S.C. 154(b) by 379 days.

This patent is subject to a terminal disclaimer.

(21) Appl. No.: 12/602,494

(22) PCT Filed: May 29, 2008

(86) PCT No.: PCT/JP2008/059947
§ 371 (c)(1),
(2), (4) Date: Feb. 3, 2010

(87) PCT Pub. No.: WO2008/146889
PCT Pub. Date: Dec. 4, 2008

(65) Prior Publication Data
US 2010/0173632 A1    Jul. 8, 2010

(30) Foreign Application Priority Data
May 30, 2007 (JP) ................ 2007-144176

(51) Int. Cl.
*H04W 36/00* (2009.01)
(52) U.S. Cl. .............. 455/436; 455/442; 455/432.1; 455/435.1; 455/422.1; 370/331

(58) Field of Classification Search .............. 455/436, 455/442, 432.1, 435.1, 422.1; 370/331
See application file for complete search history.

(56) References Cited

U.S. PATENT DOCUMENTS
2010/0150011 A1*  6/2010  Kitaji ............... 370/252
2010/0255845 A1* 10/2010  Kitaji ............... 455/436

FOREIGN PATENT DOCUMENTS
| EP | 1 575 320 | 9/2005 |
| JP | 2005-229583 | 8/2005 |
| JP | 2007-013553 | 1/2007 |
| JP | 2007-027952 | 2/2007 |
| JP | 4312155 | 8/2009 |

OTHER PUBLICATIONS

International Search Report for PCT/JP2008/059947, mailed on Jul. 1, 2008, 1 page.

* cited by examiner

*Primary Examiner* — Nghi H Ly
(74) *Attorney, Agent, or Firm* — Duane Morris LLP

(57) ABSTRACT

A radio terminal (100) includes a radio condition information acquisition unit configured to acquire radio condition information indicating a condition of a radio signal (RS) which is transmitted to or received from a radio base station (11), and a handover execution unit configured to execute handover to a radio base station (21) on the basis of the handover threshold included in the received threshold notification response and the radio condition information acquired by the radio condition information acquisition unit.

19 Claims, 10 Drawing Sheets

FIG. 7

SESSION NOTIFICATION RESPONSE

TH

R1

| APPLICATION | COMMUNICATION SYSTEM | THRESHOLD PARAMETER | THRESHOLD | THRESHOLD DETERMINATION |
|---|---|---|---|---|
| = G711 | = EVDO | = C / I | = −3dB | Off |

SESSION NOTIFICATION RESPONSE

| APPLICATION | COMMUNICATION SYSTEM | THRESHOLD PARAMETER | THRESHOLD | THRESHOLD DETERMINATION |
|---|---|---|---|---|
| = G711 | = EVDO | − | − | On |

FIG. 10

RADIO CONDITION INFORMATION

| APPLICATION<br>= G711 | COMMUNICATION<br>SYSTEM<br>= WiMAX | COMMUNICATION<br>SYSTEM BEFORE<br>HANDOVER<br>= EVDO | RADIO CONDITION<br>INFORMATION |

| APPLICATION | COMMUNICATION SYSTEM | THRESHOLD PARAMETER | THRESHOLD |
|---|---|---|---|
| G711 | EVDO | C / I | 3 |
| G711 | WiMAX | RSSI | −85 |
| G729 | EVDO | C / I | −2 |
| G729 | WiMAX | RSSI | −92 |
| G729 | WiMAX | RSSI | −78 |
| ⋮ | ⋮ | ⋮ | ⋮ |

TBa

COMMUNICATION SYSTEM, THRESHOLD MANAGEMENT SERVER, RADIO COMMUNICATION DEVICE, AND COMMUNICATION METHOD

CROSS-REFERENCE TO RELATED APPLICATIONS

This is a US National Phase Application of International Application No. PCT/JP2008/059947 filed May 29, 2008, which claims priority to Japanese Patent Application No. 2007-144176 filed May 30, 2007, the disclosures of which are incorporated herein by reference in their entirety.

TECHNICAL FIELD

The present invention relates to a communication system which executes handover according to a quality of an application and a threshold management server, a radio communication device, and a communication method which are used in the communication system.

BACKGROUND ART

Along with the recent spread of radio communication technologies, an environment is being established in which multiple radio communication systems of different communication schemes can be utilized at the same time. For example, consideration has been made to provide a radio communication device which is connectable to both of a system of cdma2000 n x evolution-data only (EV-DO) which is one of the third generation cellular phone systems, and a wireless MAN system (mobile WiMAX) which is defined by IEEE802.16e or the like.

Such a radio communication device connectable to multiple radio communication systems monitors a condition of a radio signal (for example, RSSI) received from a radio base station in connection, quality of throughput or the like. Thereby, the radio communication device can execute handover to a radio base station in another radio communication system before ongoing communication is cut by deterioration of the quality (for example, Patent Document 1).

Patent Document 1: JP-A 2004-561996 (pages 11 and 12, FIG. 5)

DISCLOSURE OF THE INVENTION

However, the above-described conventional radio communication device has the following problem. To be precise, the radio communication device uses multiple applications of real-time based applications such as a voice call utilizing VoIP and of non-real-time based applications such as browsing of web sites. The real-time based applications and the non-real-time based applications have different thresholds of the quality, at which handover to another communication system is required.

In addition, the radio communication device connectable to multiple radio communication systems uses different values for the respective radio communication systems, as a value indicting the condition of a radio signal (radio condition information) such as RSSI, and being to be compared with a threshold of the communication quality at which handover is required. Furthermore, a user of the radio communication device as needed changes applications executed in the radio communication device from one to another.

In other words, the above-described conventional radio communication device has a problem that handover to another radio communication system cannot be executed at proper timing for each application executed in the radio communication device.

The present invention has been made in view of the foregoing circumstances. Accordingly, an object of the present invention is to provide a communication system, a threshold management server, a radio communication device, and a communication method, which enables execution of handover to another radio communication system at proper timing for each application when a quality of an application is deteriorated.

In order to solve the aforementioned problem, the present invention includes the following characteristics. To being with, a first characteristic of the present invention is summarized as a communication system, comprising: a radio communication device (radio terminal 100) configured to execute an application (for example, VoIP), and to execute a communication with a communication target device (communication target device 200) through a radio base station (radio base station 11); and a threshold management server (threshold management server 300) configured to manage a handover threshold (handover threshold TH) corresponding to the application, wherein the threshold management server comprises: a server side receiver (communication unit 301 and threshold collection/delivery unit 303) configured to receive, from the radio communication device, an execution notification (session notification N1) including a type of the application executed in the radio communication device; a storage (storage 305) configured to store the handover threshold in association with the application; and a server side transmitter (communication unit 301 and threshold collection/delivery unit 303) configured to transmit a threshold notification response (session notification response R1) to the radio communication device on the basis of the execution notification received by the server side receiver, the threshold notification response including the handover threshold stored in the storage, and the radio communication device comprises: a device side transmitter (for example, EVDO communication unit 101 and WiMAX communication unit 103) configured to transmit the execution notification to the threshold management server; a device side receiver (for example, EVDO communication unit 101 and WiMAX communication unit 103) configured to receive the threshold notification response from the threshold management server; a radio condition information acquisition unit (radio condition information acquisition unit 105) configured to acquire radio condition information indicating a condition of a radio signal (radio signal RS) which is transmitted to or received from the radio base station; and a handover execution unit (handover controller 107) configured to execute handover to another radio base station (radio base station 21) on the basis of the handover threshold included in the threshold notification response received by the device side receiver and the radio condition information acquired by the radio condition information acquisition unit.

In accordance with such a communication system, the threshold notification response including the handover threshold corresponding to the application is transmitted to a radio communication device on the basis of the execution notification including the type of application executed in the radio communication device. In addition, the radio communication device executes handover to another radio base station on the basis of the handover threshold and the radio condition information indicating the condition of the radio signal which is transmitted to or received from the radio base station.

For this reason, the timing for executing the handover to another radio base station can be set according to the handover threshold corresponding to the application executed in the radio communication device, that is, the quality of the application. In other words, such a communication system can execute handover to another radio communication system at proper timing for each application when the quality of the application is deteriorated.

A second characteristic of the present invention is summarized as the communication system according to the first characteristic of the present invention, wherein the handover execution unit executes the handover when the condition of the radio signal indicated by the radio condition information falls below the handover threshold.

A third characteristic of the present invention is summarized as the communication system according to the first or second characteristic of the present invention, wherein the radio communication device executes a communication with the communication target device by using any one of a plurality of radio communication systems (radio communication systems 10, 20), and the handover execution unit executes handover to another radio communication system on the basis of the handover threshold included in the threshold notification response and the radio condition information.

A fourth characteristic of the present invention is summarized as the communication system according to the first or second characteristic of the present invention, wherein the server side transmitter transmits a determination request (session notification response R2) for requesting to determine the handover threshold to the radio communication device, the radio communication device comprises a threshold determination unit (handover controller 107) configured to determine the radio condition information as the handover threshold on the basis of the determination request received by the device side receiver, the radio condition information corresponding to a deteriorated condition of a quality (for example, communication quality or throughput) of the application which is being executed in the radio communication device, the device side transmitter transmits a post-determination threshold notification (radio condition information N2) to the threshold management server, the post-determination threshold notification including the handover threshold determined by the threshold determination unit and the type of application which is being executed in the radio communication device, and the storage stores the handover threshold in association with the application, on the basis of the post-determination threshold notification received by the server side receiver from the radio communication device.

A fifth characteristic of the present invention is summarized as the communication system according to the first or second characteristic of the present invention, wherein the storage stores the application, the handover threshold, and traffic information (traffic congestion degree) in association with one another, the traffic information indicating a condition of traffic handled in a radio communication system, the threshold management server includes a traffic acquisition unit (threshold collection/delivery unit 303) configured to acquire the traffic information, and the server side transmitter transmits a threshold notification response to the radio communication device on the basis of the type of application included in the execution notification and the condition of traffic included in the traffic information acquired by the traffic acquisition unit, the threshold notification response including any one of handover thresholds stored in the storage.

A sixth characteristic of the present invention is summarized as the communication system according to the fourth characteristic of the present invention, wherein the threshold management server comprises a traffic acquisition unit (threshold collection/delivery unit 303) configured to acquire traffic information indicating a condition of traffic handled in a radio communication system, the server side transmitter transmits the determination request to the radio communication device when the traffic acquisition unit acquires the traffic information, the storage stores the application, the handover threshold, and the condition of traffic in association with one another on the basis of the post-determination threshold notification corresponding to the determination request transmitted when the traffic information is acquired, and the server side transmitter transmits a threshold notification response to the radio communication device on the basis of the type of application included in the execution notification and the condition of traffic included in the traffic information acquired by the traffic acquisition unit, the threshold notification response including any one of handover thresholds stored in the storage.

A seventh characteristic of the present invention is summarized as a threshold management server managing a handover threshold corresponding to an application executed in a radio communication device executing a communication with a communication target device through a radio base station, the threshold management server comprising: a server side receiver configured to receive an execution notification from the radio communication device, the execution notification including a type of the application executed in the radio communication device; a storage configured to store the handover threshold in association with the application; and a server side transmitter configured to transmit a threshold notification response to the radio communication device on the basis of the execution notification received by the server side receiver, the threshold notification response including the handover threshold stored in the storage.

An eighth characteristic of the present invention is summarized as the threshold management server according to the seventh characteristic of the present invention, wherein the server side transmitter transmits a determination request for requesting to determine the handover threshold to the radio communication device.

A ninth characteristic of the present invention is summarized as the threshold management server according to the seventh or eighth characteristic of the present invention, wherein the radio communication device determines the radio condition information as the handover threshold, the radio condition information corresponding to a deteriorated condition of a quality of the application which is being executed in the radio communication device, the server side receiver receives, from the radio communication device, a post-determination threshold notification including the handover threshold determined in the radio communication device and the type of application which is being executed in the radio communication device, and the storage stores the handover threshold in association with the application on the basis of the post-determination threshold notification received by the server side receiver.

A tenth characteristic of the present invention is summarized as the threshold management server according to the seventh or eighth characteristic of the present invention, wherein the storage stores the application, the handover threshold, and traffic information in association with one another, the traffic information indicating a condition of traffic handled in a radio communication system, the threshold management server further comprising a traffic acquisition unit configured to acquire the traffic information, wherein the server side transmitter transmits a threshold notification response to the radio communication device, on the basis of the type of application included in the execution notification and the condition of traffic included in the traffic information acquired by the traffic acquisition unit, the threshold notification response including any one of handover thresholds stored in the storage.

An eleventh characteristic of the present invention is summarized as the threshold management server according to the seventh or eighth characteristic of the present invention, further comprising a traffic acquisition unit configured to acquire traffic information indicating a condition of traffic handled in the radio communication system, wherein the server side transmitter transmits the determination request to the radio communication device when the traffic acquisition unit acquires the traffic information, the storage stores the application, the handover threshold, and the condition of traffic in association with one another on the basis of the post-determination threshold notification corresponding to the determination request transmitted when the traffic information is acquired, and the server side transmitter transmits a threshold notification response to the radio communication device on the basis of the type of application included in the execution notification and the condition of traffic included in the traffic information acquired by the traffic acquisition unit, the threshold notification response including any one of handover thresholds stored in the storage.

A twelfth characteristic of the present invention is summarized as a radio communication device which executes an application and executes a communication with a communication target device through a radio base station, the radio communication device comprising: a device side transmitter configured to transmit an execution notification to a threshold management server managing a handover threshold, the execution notification including a type of the application executed in the radio communication device; a device side receiver configured to receive, from the threshold management server, a threshold notification response including the handover threshold; a radio condition information acquisition unit configured to acquire radio condition information indicating a condition of a radio signal which is transmitted to or received from the radio base station; and a handover execution unit configured to execute handover to another radio base station on the basis of the handover threshold included in the threshold notification response received by the device side receiver and the radio condition information acquired by the radio condition information acquisition unit.

A thirteenth characteristic of the present invention is summarized as the radio communication device according to the twelfth characteristic of the present invention, wherein the handover execution unit executes the handover when the condition of the radio signal indicated by the radio condition information falls below the handover threshold.

A fourteenth characteristic of the present invention is summarized as the radio communication device according to the twelfth or thirteenth characteristic of the present invention, wherein the radio communication device executes a communication with the communication target device by using any one of a plurality of radio communication systems, and the handover execution unit executes handover to another radio communication system on the basis of the handover threshold included in the threshold notification response and the radio condition information.

A fifteenth characteristic of the present invention is summarized as a communication method for executing a communication on the basis of a handover threshold corresponding to an application executed in a radio communication device executing a communication with a communication target device through a radio base station, the communication method comprising the steps of: transmitting, at the radio communication device, an execution notification including a type of the application executed in the radio communication device; transmitting a threshold notification response including the handover threshold to the radio communication device on the basis of the received execution notification; acquiring, at the radio communication device, radio condition information indicating a condition of a radio signal which is transmitted to or received from the radio base station; executing, at the radio communication device, handover to another radio base station on the basis of the handover threshold included in the threshold notification response received by the radio communication device and the radio condition information acquired by the radio communication device.

The features of the present invention can provide a communication system, a threshold management server, a radio communication device, and a communication method which enables execution of handover to another radio communication system at proper timing for each application when the quality is deteriorated.

BRIEF DESCRIPTION OF THE DRAWINGS

FIG. 7 is a view showing an example of a session notification response R1 (a threshold notification response) according to the embodiment of the present invention.

FIG. 8 is a view showing an example of a session notification response R2 according to the embodiment of the present invention.

FIG. 10 is a view showing an example of radio condition information N3 according to the embodiment of the present invention.

FIG. 15 is a view showing an example of a threshold information table TBa according to a modified embodiment of the present invention.

BEST MODES FOR CARRYING OUT THE INVENTION

Figure 1:
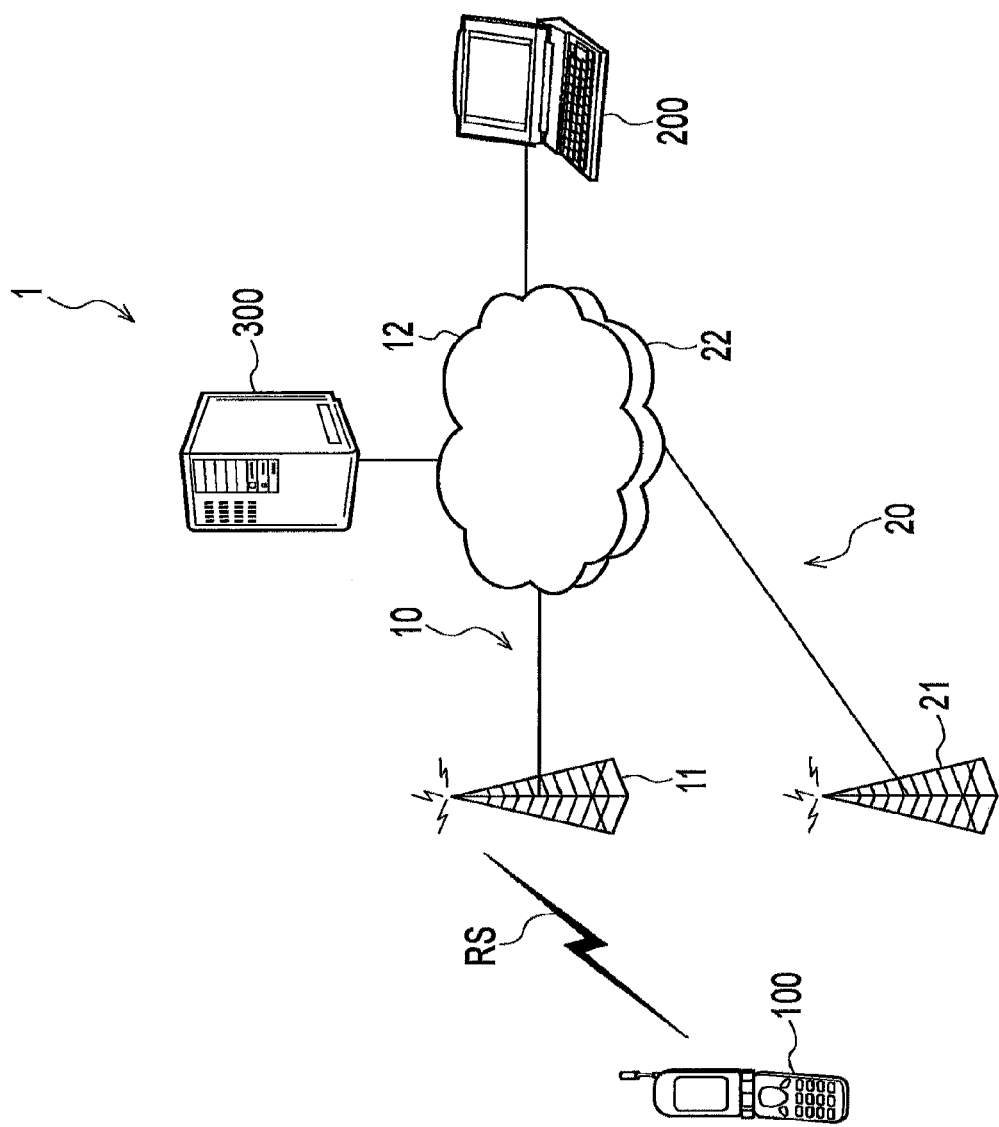
FIG. 1 is an overall schematic configuration diagram of a communication network including a communication network 1 according to an embodiment of the present invention.

Next, an embodiment of the present invention is described. Specifically, the description is given in the following order: (1) an overall schematic configuration of a communication network including a communication system, (2) a functional block configuration of a radio communication device, (3) a functional block configuration of a threshold management server, (4) an operation of the communication system, (5) advantageous effects, and (6) other embodiments.

In the following description of the drawings, same or similar portions are denoted with same or similar reference numerals. However, it should be noted that the drawings are schematic and ratios of dimensions and the like are different from actual ones.

Therefore, specific dimensions and the like should be determined by taking into consideration of the following description. Moreover, as a matter of course, also among the drawings, there are included portions in which dimensional relationships and ratios are different from each other.

(1) Overall Schematic Configuration of Communication Network Including Communication System FIG. 1 is an overall schematic configuration diagram of a communication network 1 including a communication system according to the present embodiment. As shown in FIG. 1, the communication network 1 includes a radio terminal 100, a communication target device 200, and a threshold management server 300.

The radio terminal 100 is a small-sized radio communication device which can be carried by a user. In the following description, the radio terminal 100 is expressed by MN 100 (Mobile Node) as needed. The radio terminal 100 executes a predetermined application, in this embodiment, a voice call application utilizing VoIP. The radio terminal 100 executes a communication with the communication target device 200 by using any of radio communication systems 10 and 20. Specifically, the radio terminal 100 executes the voice call application and executes the communication with the communication target device 200 through a radio base station 11 or a radio base station 21.

The radio communication system 10 includes the radio base station 11 and a backbone network 12. The radio communication system 10 complies with cdma2000 n x evolution-data only (EV-DO) which is one of the third generation cellular phone systems.

The radio communication system 20 includes the radio base station 21 and a backbone network 22. The radio communication system 20 complies with the standards of the wireless MAN system (Mobile WiMAX), which are defined by IEEE 802.16e or the like.

The communication target device 200, similarly to the radio terminal 100, executes a voice call application utilizing VoIP. In the following description, the communication target device 200 is expressed by CN 200 (Corresponding Node) as needed. The communication target device 200 can be connected to the backbone network 12 and the backbone network 22 through a predetermined access communication network (unillustrated).

The threshold management server 300 manages a handover threshold TH (unillustrated in FIG. 1, see FIG. 5) corresponding to an application executed in the radio terminal 100. The threshold management server 300 can be connected to the backbone network 12 and the backbone network 22 through the predetermined access communication network (unillustrated).

When the condition of a radio signal RS (for example, RSSI) transmitted from a radio base station (for example, the radio base station 11) configuring the radio communication system 10 is deteriorated, the MN 100 used in the communication network 1 can execute handover to the radio base station 21 configuring the radio communication system 20 having a different communication scheme.

(2) Functional Block Configuration of Radio Communication Device

Figure 2:
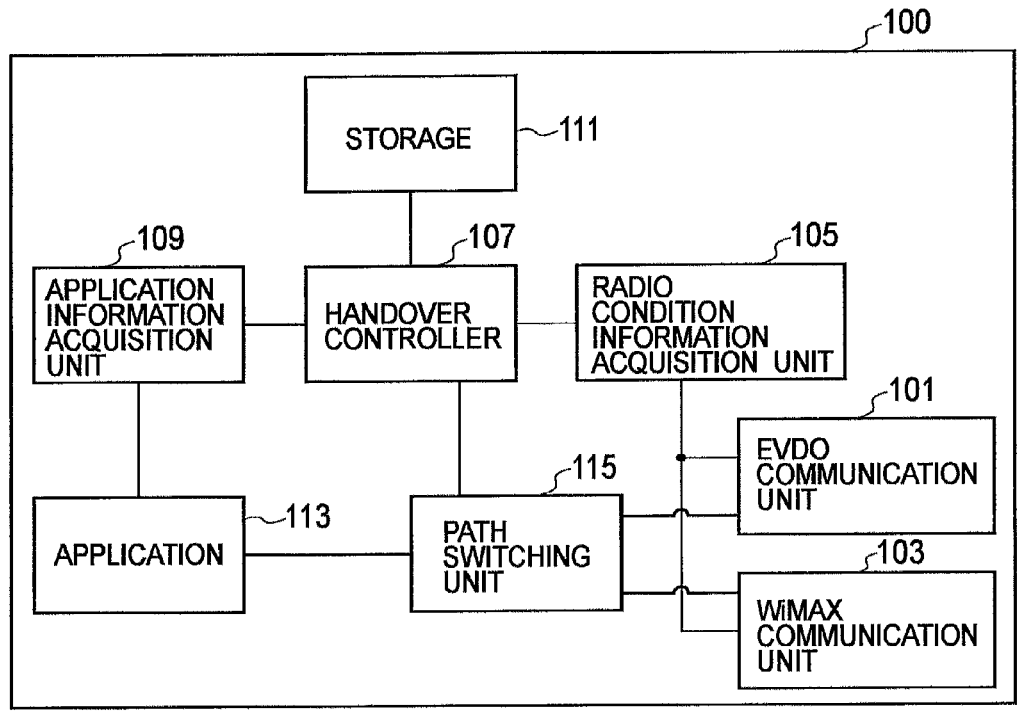
FIG. 2 is a functional block configuration diagram of a radio terminal 100 (a radio communication device) according to the embodiment of the present invention.

FIG. 2 is a functional block configuration diagram of the MN 100 configuring the radio communication device in the present embodiment. As shown in FIG. 2, the MN 100 includes an EVDO communication unit 101, a WiMAX communication unit 103, a radio condition information acquisition unit 105, a handover controller 107, an application information acquisition unit 109, a storage 111, an application 113, and a path switching unit 115.

The EVDO communication unit 101 executes radio communication with the radio base station 11 in compliance with EV-DO. The WiMAX communication unit 103 executes a radio communication with the radio base station 21 in compliance with the standards of the wireless MAN system (Mobile WiMAX).

The EVDO communication unit 101 and the WiMAX communication unit 103 transmit a session notification N1 (see FIG. 6) to the threshold management server 300, the session notification N1 including the type of application executed in the MN 100. In the present embodiment, the EVDO communication unit 101 and the WiMAX communication unit 103 configure a device side transmitter.

Figure 6:
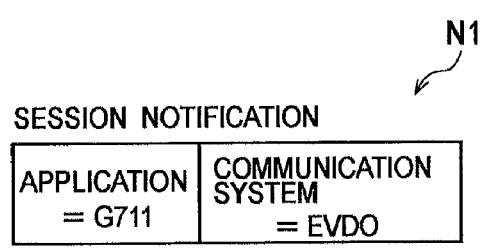
FIG. 6 is a view showing an example of a session notification N1 (an execution notification) according to the embodiment of the present invention.

As shown in FIG. 6, the session notification N1 (an execution notification) includes a field indicating the type of application (the application in the figure) executed in the MN 100 and a field indicating the radio communication system (the radio communication system in the figure) to which the MN 100 is connected. Note that the application type "G711" is a voice call application, and indicates that a voice codec to be used complies with the ITU-T recommendations G.711.

Figure 5:
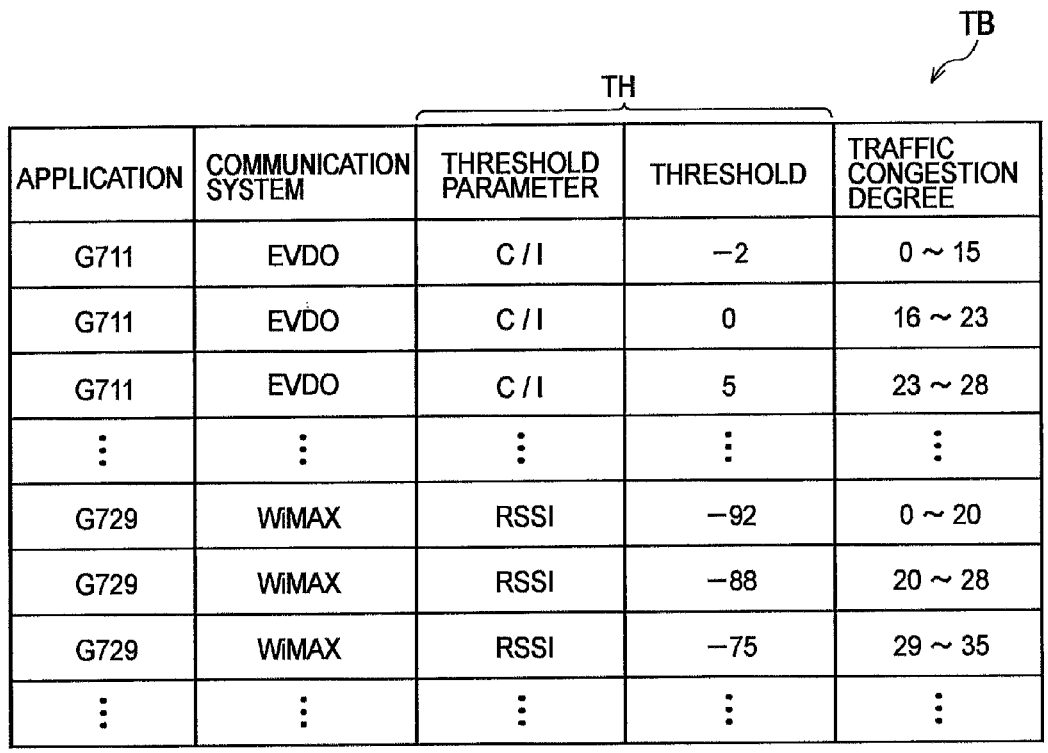
FIG. 5 is a view showing an example of a threshold information table TB according to the embodiment of the present invention.

The EVDO communication unit 101 and the WiMAX communication unit 103 receive a session notification response R1 (see, for example, FIG. 7) from the threshold management server 300, the session notification response R1 including the handover threshold TH (see FIG. 5). In the present embodiment, the EVDO communication unit 101 and the WiMAX communication unit 103 configure a device side receiver.

The session notification response R1 is transmitted to the MN 100 from the threshold management server 300 when the threshold management server 300 receives the session notification N1.

As shown in FIG. 7, similar to the session notification N1, the session notification response R1 (a threshold notification response) includes a field indicating the type of application which is executed in the MN 100 and a field indicating the radio communication system to which the MN 100 is connected.

In addition, the session notification response R1 includes fields indicating a combination of a handover threshold TH, specifically, a threshold parameter (for example, C/I) and a threshold (−3 dB). Furthermore, the session notification response R1 includes a field indicating whether threshold determination is needed.

The EVDO communication unit 101 and the WiMAX communication unit 103 can transmit the radio condition information N2 (see FIG. 9) to the threshold management server 300, the radio condition information N2 including the handover threshold TH determined by the handover controller 107 and the type of application being executed in the MN 100.

Figure 9:
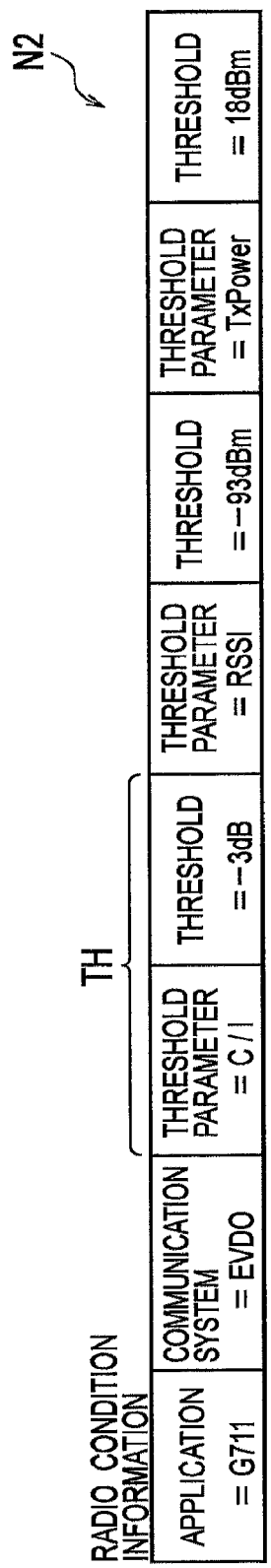
FIG. 9 is a view showing an example of radio condition information N2 (a post-determination threshold notification) according to the embodiment of the present invention.

As shown in FIG. 9, similar to the session notification response R1, the radio condition information N2 (a post-determination threshold notification) includes a field indicating the type of application executed in the MN 100 and a field indicating the radio communication system to which the MN 100 is connected. Furthermore, the radio condition information N2 includes a field indicating a combination of a handover threshold TH, specifically, a threshold parameter and a threshold. Note that the number of handover thresholds TH included in the radio condition information N2 may be changed as needed.

In addition, the EVDO communication unit 101 and the WiMAX communication unit 103 can transmit radio condition information N3 (see FIG. 10) to the threshold management server 300. The radio condition information N3 is transmitted to the threshold management server 300 from the MN 100 when the MN 100 receives a quality deterioration notification from the CN 200, the quality deterioration notification indicating deterioration of a quality (for example, a call quality or throughput) of the application which is being executed in the CN 200.

As shown in FIG. 10, similar to the session notification response R1 and the radio condition information N2, the radio condition information N3 includes a field indicating the type of application executed in the MN 100 and a field indicating the radio communication system to which the MN 100 is connected. Also, the radio condition information N3 includes a field indicating the radio communication system connected before the handover (a communication system before handover) and a field indicating the radio condition information such as RSSI in the MN 100.

The radio condition information acquisition unit 105 acquires the radio condition information (for example, RSSI) indicating the condition of the radio signal RS (see FIG. 1) which the EVDO communication unit 101 transmits to or receives from the radio base station 11. In addition, the radio condition information acquisition unit 105 acquires the radio condition information indicating a condition of the radio signal which the WiMAX communication unit 103 transmits to or receives from the radio base station 21.

Specifically, the radio condition information acquisition unit 105 acquires the radio condition information from the EVDO communication unit 101 or the WiMAX communication unit 103, and notifies the handover controller 107 of the acquired radio condition information.

As the radio condition information, for example, RSSI, CIR, and transmission power (TxPower) can be used.

The handover controller 107 executes handover to another radio base station (for example, the radio base station 21) on the basis of the handover threshold TH included in the session notification response R1 and the radio condition information acquired by the radio condition information acquisition unit 105. In the present embodiment, the handover controller 107 configures a handover execution unit.

The handover controller 107 executes handover from another radio base station, for example, the radio base station 11 to the radio base station 21 when the condition of the radio signal RS indicated by the radio condition information falls below the handover threshold TH. In other words, the handover controller 107 executes handover from the radio communication system 10 to the radio communication system 20 having a different communication scheme.

Specifically, the handover controller 107 executes the handover by notifying the path switching unit 115 of a path switching instruction.

In addition, based on a session notification response R2 (see FIG. 8) received by the EVDO communication unit 101 and the WiMAX communication unit 103, the handover controller 107 determines, as the handover threshold TH, the radio condition information corresponding to the deteriorated condition of the quality of the application which is being executed in the MN 100. In the present embodiment, the handover controller 107 configures a threshold determination unit. Note that the session notification response R2 is described later in detail.

The application information acquisition unit 109 is connected to the application 113 through a middleware and the like, and acquires information of a packet which is transmitted from or received by the application 113. Specifically, the application information acquisition unit 109 acquires the port number of the packet. The application information acquisition unit 109 notifies the handover controller 107 of the acquired port number of the packet. The handover controller 107 detects the type of application 113 on the basis of the port number notified by the application information acquisition unit 109. Note that the handover controller 107 may detect the type of application 113 by acquiring codec information from the RTP payload type of the packet.

In addition, the application information acquisition unit 109 determines whether the quality of the application which is being executed in the application 113 is deteriorated, and notifies the handover controller 107 of the determined quality.

The storage 111 stores the handover threshold TH and the like on the basis of control of the handover controller 107.

The application 113 is configured of a predetermined application program and an execution environment (CPU or the like). In the present embodiment, the application 113 is a voice call application utilizing VoIP.

The application 113 outputs a RTP packet containing voice data encoded by a voice codec to the path switching unit 115 at a predetermined interval (for example, 20 ms). In addition, the application 113 acquires the RTP packet outputted from the path switching unit 115.

The path switching unit 115 switches to any of the paths of the EVDO communication unit 101 and the WiMAX communication unit 103, that is, any of the radio communication system 10 and the radio communication system 20, on the basis of the path switching instruction notified from the handover controller 107.

The RTP packet outputted from the application 113 is relayed to the EVDO communication unit 101 or the WiMAX communication unit 103 through the path switching unit 115. In addition, the RTP packet received through the EVDO communication unit 101 or the WiMAX communication unit 103 is relayed to the application 113 through the path switching unit 115.

(3) Functional Block Configuration of Threshold Management Server

Figure 3:
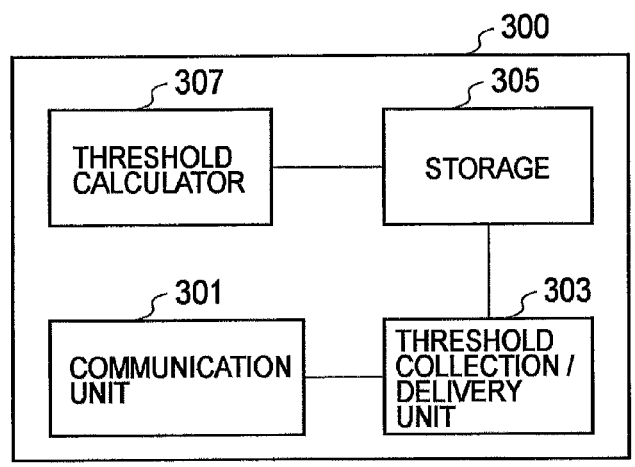
FIG. 3 is a functional block configuration diagram of a threshold management server 300 according to the embodiment of the present invention.

FIG. 3 is a functional block configuration diagram of the threshold management server 300. As shown in FIG. 3, the threshold management server 300 includes a communication unit 301, a threshold collection/delivery unit 303, a storage 305, and a threshold calculator 307.

The communication unit 301 is configured of a communication interface (for example, Ethernet (registered trademark)) for making an access to a predetermined access communication network (unillustrated) connected to the backbone network 12 and the backbone network 22.

The threshold collection/delivery unit 303 executes collection and delivery of the handover threshold TH used for determining whether handover to another radio base station is executed in the MN 100. Specifically, the threshold collection/delivery unit 303 receives the session notification N1 (see FIG. 6) from the MN 100. As described above, the session notification N1 includes the type of application executed in the MN 100, more accurately, the type of application which is being executed in the MN 100. In the present embodiment, the communication unit 301 and the threshold collection/delivery unit 303 configure a server side receiver.

The threshold collection/delivery unit 303 transmits the session notification response R1 (see FIG. 7) to the MN 100 on the basis of the session notification N1 received from the MN 100. In the present embodiment, the communication unit 301 and the threshold collection/delivery unit 303 configure a server side transmitter.

Specifically, the threshold collection/delivery unit 303 refers to a threshold information table TB (see FIG. 5) stored in the storage 305, and transmits the session notification response R1 including the handover threshold TH to the MN 100.

In addition, the threshold collection/delivery unit 303 can transmit the session notification response R2 (see FIG. 8) to the MN 100. The session notification response R2 is transmitted to the MN 100 in place of the session notification response R1.

As shown in FIG. 8, the session notification response R2 (a determination request) has a substantially same configuration as that of the session notification response R1. As compared with the session notification response R1, a field of the session notification response R2 indicating the handover threshold TH, specifically, the field indicating the threshold parameter and the threshold is blank. On the other hand, "ON" is written in a threshold determination field. The "ON" means that the MN 100 is being requested of determining the handover threshold TH according to the quality of the application which is being executed in the MN 100.

In addition, the threshold collection/delivery unit 303 acquires traffic information indicating the condition of traffic handled by the radio communication systems 10 and 20. In the present embodiment, the threshold collection/delivery unit 303 configures a traffic acquisition unit.

Figure 12:
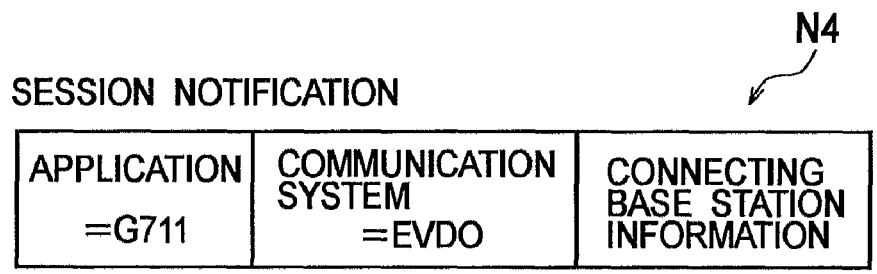
FIG. 12 is a view showing an example of a session notification N4 according to the embodiment of the present invention.
Figure 13:
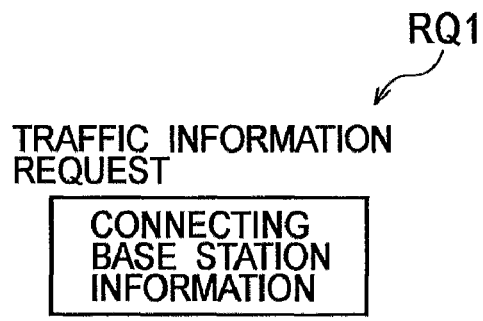
FIG. 13 is a view showing an example of a traffic information request RQ1 according to the embodiment of the present invention.
Figure 14:
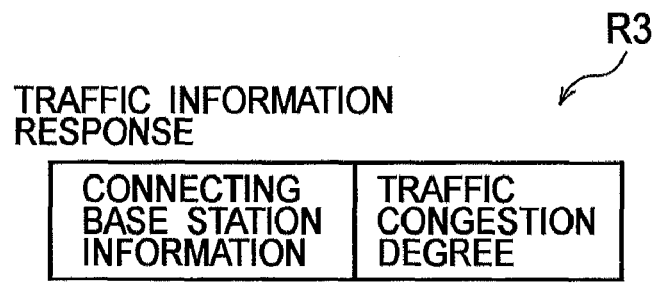
FIG. 14 is a view showing an example of a traffic information response R3 according to the embodiment of the present invention.

Specifically, the threshold collection/delivery unit 303 acquires the traffic information by using a session notification N4 shown in FIG. 12, a traffic information request RQ1 shown in FIG. 13, and a traffic information response R3 shown in FIG. 14. The method for acquiring traffic information by using the session notification N4, the traffic information request RQ1, and the traffic information response R3, is described later.

In the present embodiment, the threshold collection/delivery unit 303 acquires traffic congestion degrees of the radio communication systems 10 and 20 from the radio communication systems 10 and 20, respectively. The traffic congestion degree shows a ratio of a band which is being used for communications to the total bands available in the radio base station 11 (21) of the radio communication system 10 (20). The traffic congestion degree is shown by a numerical value of 0 to 100%. Note that the traffic congestion degree may be determined based on not only the ratio, but on the number of radio terminals which are being connected to the radio base station, for example.

Based on the type of application included in the session notification N1, the traffic condition (a traffic congestion degree) included in the acquired traffic information, and the like, the threshold collection/delivery unit 303 transmits the session notification response R1 (a threshold notification response) to the MN 100, the session notification response R1 including any one of the handover thresholds TH stored in the storage 305.

In addition, the threshold collection/delivery unit 303 can transmit the session notification response R2 (a determination request) to the MN 100.

The storage 305 stores the application executed in the MN 100 and the handover threshold TH in association with each other. Specifically, the storage 305 stores the threshold information table TB shown in FIG. 5 (or a threshold information table TBa shown in FIG. 15). In addition, the storage 305 stores the radio condition information which the threshold collection/delivery unit 303 receives from the MN 100.

As shown in FIG. 5, the threshold information table TB is configured of fields of, for example, application, communication system, threshold parameter, threshold, and traffic congestion degree. In this case, the storage 305 stores the application, the handover threshold TH, and the traffic congestion degree in association with one another.

In addition, the storage 305 can store the application and the handover threshold TH in association with each other on the basis of the radio condition information N2 (a post-determination threshold notification) which the threshold collection/delivery unit 303 receives from the MN 100.

The storage 305 stores the application, the handover threshold TH, the traffic congestion degree, and the like in association with one another on the basis of the radio condition information N2 corresponding to the session notification response R2 transmitted from the threshold collection/delivery unit 303.

The threshold calculator 307 calculates the handover threshold TH, specifically, a threshold for each of the threshold parameters by using the radio condition information stored in the storage 305.

Specifically, the threshold calculator 307 acquires n thresholds for each threshold parameter, and calculates a mean value and variance with regard to the n thresholds. The threshold calculator 307 uses the mean value of the threshold parameters having small variance as the threshold. Note that, in place of the mean value, other statistics, for example deviation (=60) and the like, may be used.

The threshold calculator 307 can update the storage information table TB stored in the storage 305 on the basis of the calculated handover threshold TH.

(4) Operation of Communication System

Next, operations of the above-described communication system (the MN 100 and the threshold management server 300) are described. The description is given of the operation where the MN 100 executes handover on the basis of the handover threshold TH.

(4.1) Operational Example 1

Figure 4:
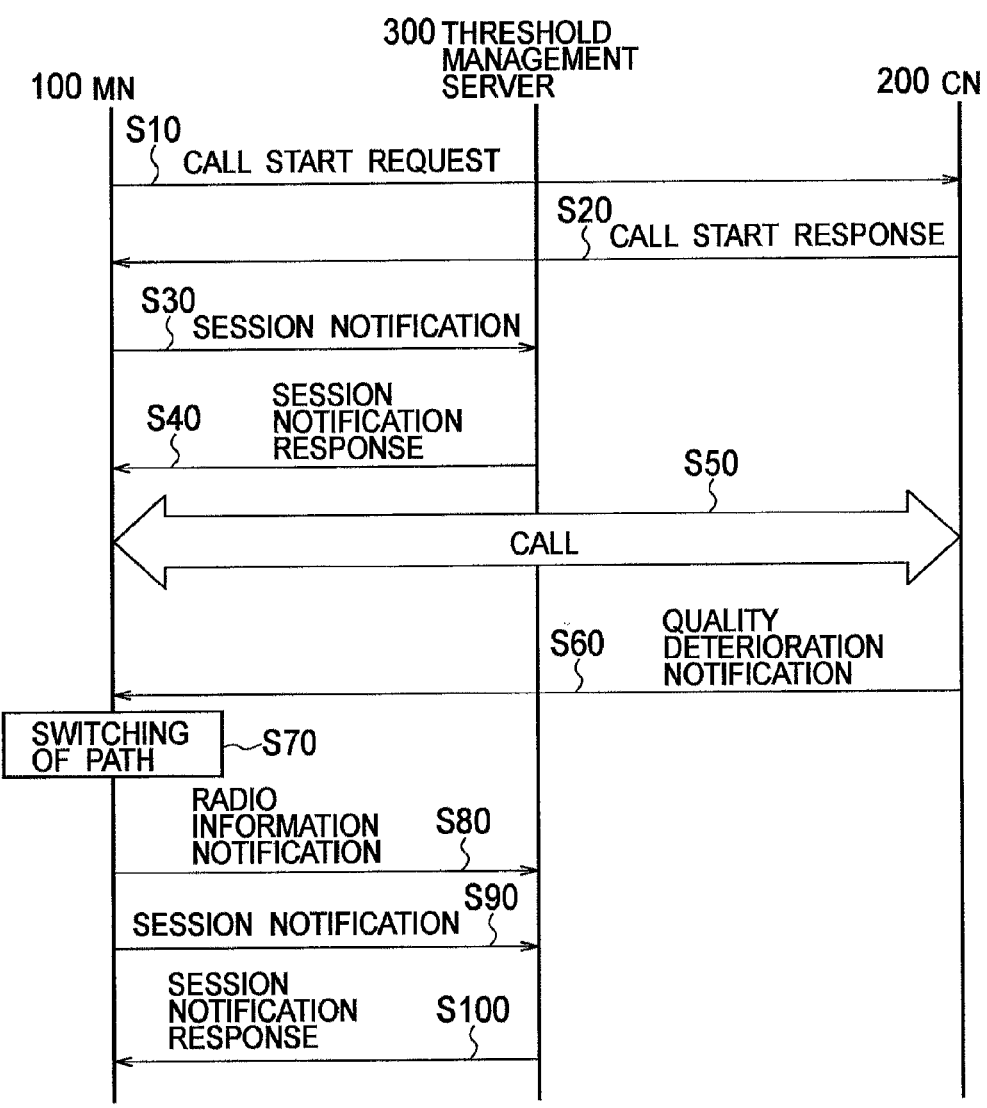
FIG. 4 is a view showing an example of a communication sequence in which the MN 100 according to the embodiment of the present invention executes handover on the basis of a handover threshold TH notified from the threshold management server 300.

FIG. 4 shows an example of a communication sequence in which the MN 100 executes handover on the basis of the handover threshold TH notified from the threshold management server 300.

As shown in FIG. 4, at step S10, the MN 100 transmits a communication start request to the CN 200, the communication start request for requesting to execute a communication with the CN 200 using a voice call application.

At step S20, the CN 200 transmits a communication start response to the MN 100, the communication start response indicating acceptance of the start of the communication using the voice call application in response to the communication start request received from the MN 100. It is assumed here that the MN 100 starts a communication with the CN 200 through the radio communication system 10, that is, the radio base station 11.

At step S30, the MN 100 transmits the session notification N1 (see FIG. 6) to the threshold management server 300 on the basis of the communication start response received from the CN 200.

At step S40, the threshold management server 300 transmits to the MN 100 the session notification response R1 (see FIG. 7) on the basis of the session notification N1 received from the MN 100.

At step S50, the MN 100 and the CN 200 start the communication using the voice call application.

At step S60, the CN 200 detects that a quality (for example, a throughput) of the voice call application which is being executed is deteriorated, and transmits the quality deterioration notification to the MN 100, the quality deterioration notification indicating that the quality of the voice call application is deteriorated.

At step S70, the MN 100 executes switching of a communication path with the CN 200, that is, handover from the radio communication system 10 to the radio communication system 20 when the MN 100 receives the quality deterioration notification from the CN 200.

At step S80, the MN 100 transmits the radio condition information N3 (see FIG. 10) to the threshold management server 300 when the MN 100 receives the quality deterioration notification from the CN 200. As described above, the radio condition information N3 includes the radio condition information at the time point when the MN 100 receives the quality deterioration notification from the CN 200. When the radio condition information N3 is received, the threshold management server 300 can update the contents of the threshold information table TB (see FIG. 5) or the threshold information table TBa (see FIG. 15) on the basis of the radio condition information included in the radio condition information N3.

At step S90, the MN 100 transmits the session notification N1 (see FIG. 6) to the threshold management server 300 along with the execution of handover to the radio communication system 20.

At step S100, the threshold management server 300 transmits the session notification response R1 (see FIG. 7) to the MN 100, the session notification response R1 including the threshold according to the application or the radio communication system on the basis of the session notification N1 received from the MN 100. Note that "WiMAX" (the radio communication system 20) is written in the field of the communication system with regard to the session notification N1 transmitted at step S90 and the session notification response R1 transmitted at step S100.

In the operational example 1, the MN 100 executes the switching of the communication path with a CN 20·BR>O after receiving the quality deterioration notification from the CN 200. However, the MN 100 may execute the switching of the communication path with the CN 200 after the MN 100 detects that the quality of the voice call application is deteriorated.

(4.2) Operational Example 2

Figure 11:
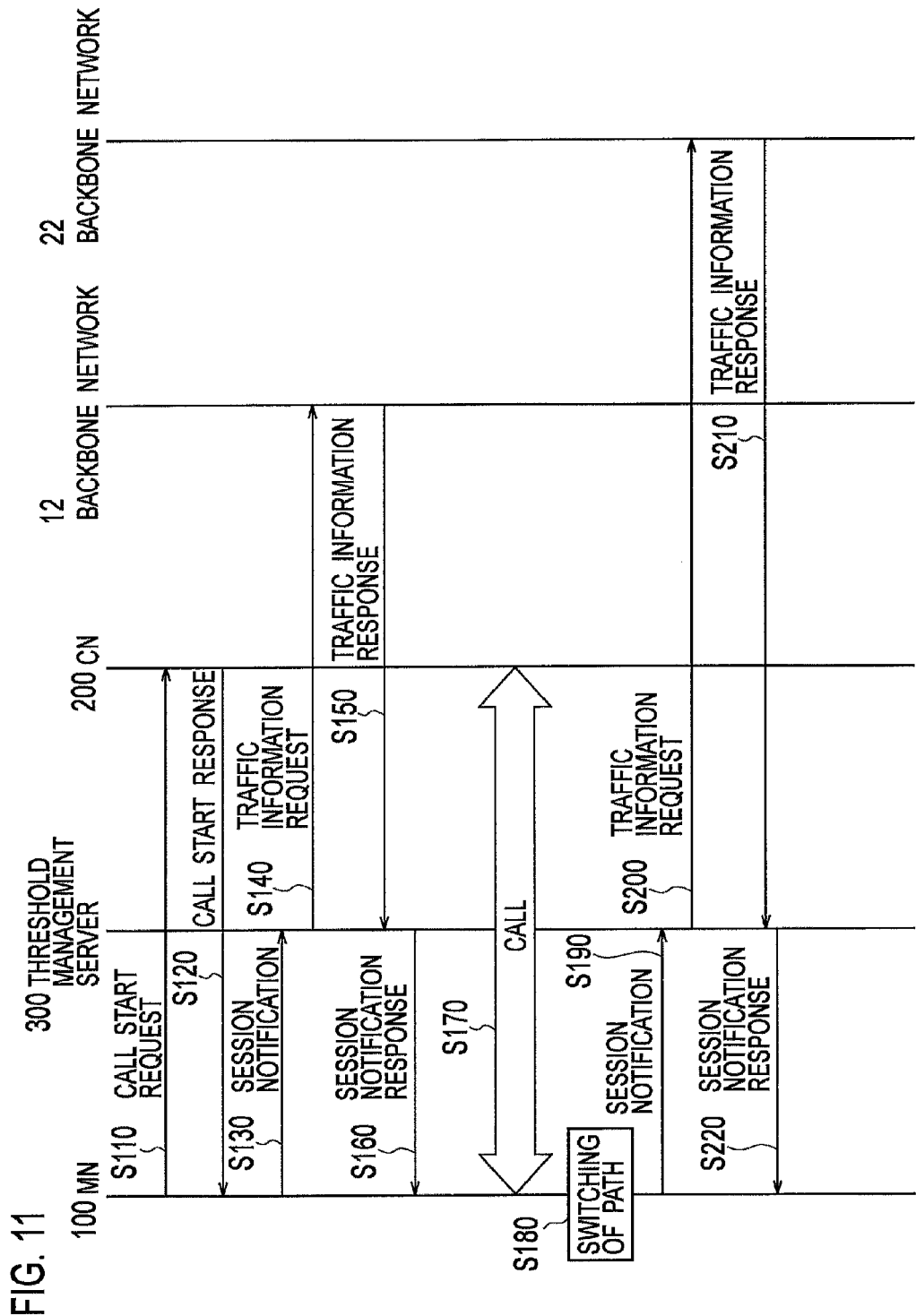
FIG. 11 is a view showing an example of another communication sequence in which the MN 100 according to the embodiment of the present invention executes handover on the basis of the handover threshold TH notified from the threshold management server 300.

FIG. 11 shows another example of a communication sequence in which the MN 100 executes handover on the basis of the handover threshold TH notified from the threshold management server 300. Specifically, in the communication sequence shown in FIG. 11, the handover threshold TH is determined based on the traffic information (the traffic congestion degree) indicating the traffic condition handled by the radio communication systems 10 and 20.

The operations at steps S110 and S120 shown in FIG. 11 are similar to those at steps S10 and S20 (see FIG. 4) described above. In other words, it is assumed here that the MN 100 starts a communication with the CN 200 through the radio communication system 10, that is, the radio base station 11.

At step S130, the MN 100 transmits the session notification N4 (see FIG. 12) to the threshold management server 300 on the basis of the communication start response received from the CN 200. The session notification N4 includes a field (connecting base station information) indicating information identifying the radio base station to which the MN 100 is connected.

At step S140, the threshold management server 300 transmits the traffic information request RQ1 (see FIG. 13) to the backbone network 12 in order to acquire the traffic congestion degree of the radio base station 11 in the backbone network 12 configuring the radio communication system 10.

Similar to the session notification N4, the traffic information request RQ1 includes a field (connecting base station information) indicating information identifying the radio base station to which the MN 100 is connected.

At step S150, the backbone network 12 transmits the traffic information response R3 (see FIG. 14) to the threshold management server 300 on the basis of the traffic information request RQ1 received from the threshold management server 300. The traffic information response R3 includes the traffic congestion degree of the backbone network 12.

At step S160, the threshold management server 300 transmits the session notification response R1 to the MN 100 (see FIG. 7) on the basis of the session notification N4 received from the MN 100. Here, referring to the threshold information table TB (see FIG. 5), the threshold management server 300 writes the handover threshold TH according to the traffic congestion degree acquired from the backbone network 12 in a predetermined field (a threshold parameter and a threshold) of the session notification response R1.

At step S170, the MN 100 and the CN 200 start a communication using the voice call application. After the start of the communication, the MN 100 monitors the condition of the radio signal RS (for example, RSSI) on the basis of the handover threshold TH included in the session notification response R1 received from the threshold management server 300.

At step S180, the MN 100 executes switching of a communication path with the CN 200, that is, handover from the radio communication system 10 to the radio communication system 20 on the basis that the condition of the radio signal RS falls below the handover threshold TH.

At step S190, the MN 100 transmits the session notification N4 (see FIG. 12) to the threshold management server 300 along with the execution of handover to the radio communication system 20. Note that in the session notification N4 transmitted at step S190, "WiMAX" (the radio communication system 20) is written in the field of the communication system.

At step S200, the threshold management server 300 transmits the traffic information request RQ1 (see FIG. 13) to the backbone network 22 in order to acquire the traffic congestion degree of the radio base station 21 in the backbone network 22 configuring the radio communication system 20.

At step S210, the backbone network 22 transmits the traffic information response R3 (see FIG. 14) to the threshold management server 300 on the basis of the traffic information request RQ1 received from the threshold management server 300.

At step S220, the threshold management server 300 transmits the session notification response R1 (see FIG. 7) to the MN 100 on the basis of the session notification N4 received from the MN 100. Here, referring to the threshold information table TB (see FIG. 5), the threshold management server 300 writes the handover threshold TH according to the traffic congestion degree acquired from the backbone network 22 in a predetermined field (a threshold parameter and a threshold) of the session notification response R1.

(5) Advantageous Effects

In accordance with the communication system (the MN 100 and the threshold management server 300) of the present embodiment, the session notification response R1 (a threshold notification response) including the handover threshold TH according to the application is transmitted to the MN 100 on the basis of the session notification N1 (the execution notification) including the type of application executed in the MN 100. In addition, the MN 100 executes handover to the radio base station 21 on the basis of the handover threshold TH and the radio condition information (for example, RSSI) indicating the condition of the radio signal RS which the MN 100 transmits to or receives from the radio base station 11.

Accordingly, the timing to execute handover to the radio base station 21 can be set according to the handover threshold TH according to the application executed in the MN 100, that is, the quality (for example, the call quality or the throughput) of the application. In other words, such a communication system can execute handover from the radio communication system 10 to the radio communication system 20 at proper timing for each application when the quality of the application is deteriorated.

In the present embodiment, the radio condition information corresponding to a deteriorated condition of a quality of the application executed in the MN 100 is determined as the handover threshold TH. In addition, the determined handover threshold TH can be stored in the threshold information table TB.

Accordingly, when a user installs a new application in the MN 100 or when a new radio communication system is introduced, a proper handover threshold TH can be autonomously set even if a relationship between the quality of the application and the radio condition information is unclear.

In the present embodiment, the handover threshold TH is set based on the traffic information (the traffic congestion degree) of the radio base station in the backbone network configuring the radio communication system which is being used by the MN 100 for communication. In addition, in the present embodiment, the handover threshold TH corresponding to the traffic congestion degree, that is, the condition of traffic can be stored in association with the traffic congestion degree in the threshold information table TB on the basis of the radio condition information acquired by the MN 100.

Consequently, the MN 100 can be caused to execute handover to another radio communication system on the basis of the handover threshold TH according to the condition of traffic of the radio communication system. In addition, the handover threshold TH according to the condition of traffic of the radio communication system can be dynamically set.

(6) Other Embodiments

As described above, the contents of the present invention have been disclosed using one embodiment of the present invention. However, it should not be understood that the description and drawings which constitute a part of this disclosure limit the invention. From this disclosure, various alternative embodiments will be apparent to a person skilled in the art.

For example, in the above-described embodiment, the handover threshold TH corresponding to the traffic congestion degree of the radio communication system is stored in association with the traffic congestion degree in the threshold information table TB. However, the handover threshold TH is not necessarily associated with the traffic congestion degree.

In this case, in place of the threshold information table TB, the threshold information table TBa shown in FIG. 15 is used.

In the above-described embodiment, the radio condition information corresponding to the deteriorated condition of the quality is determined as the handover threshold TH, and the determined handover threshold TH is stored in the threshold information table TB. However, the determination and the storage may be omitted.

In the above-described embodiment, the handover controller 107 executes handover when the condition of the radio signal RS falls below the handover threshold TH (for example, RSSI). However, depending on a threshold parameter to be used as the handover threshold TH, handover may be executed when the threshold parameter exceeds the handover threshold TH (for example, when the threshold parameter is set as a noise level).

As described above, the present invention naturally includes various embodiments which are not described herein. Accordingly, the technical scope of the present invention is only defined from the features the invention according to the scope of claims which are appropriate from the description above.

INDUSTRIAL APPLICABILITY

As described above, the communication system, the threshold management server, the radio communication device, and the communication method according to the invention can execute handover to another radio communication system at proper timing for each application when the quality of the application is deteriorated, and, thus, are useful for radio communications such as mobile communications.

The invention claimed is:

1. A communication system, comprising:
a radio communication device configured to execute an application, and to execute a communication with a communication target device through a radio base station; and
a threshold management server configured to manage a handover threshold corresponding to the application, wherein the threshold management server comprises:
- a server side receiver configured to receive, from the radio communication device, an execution notification including a type of the application executed in the radio communication device;
- a storage configured to store the handover threshold in association with the application; and
- a server side transmitter configured to transmit a threshold notification response to the radio communication device on the basis of the execution notification received by the server side receiver, the threshold notification response including the handover threshold stored in the storage, and the radio communication device comprises:
- a device side transmitter configured to transmit the execution notification to the threshold management server;
- a device side receiver configured to receive the threshold notification response from the threshold management server;
- a radio condition information acquisition unit configured to acquire radio condition information indicating a condition of a radio signal which is transmitted to or received from the radio base station; and
- a handover execution unit configured to execute handover to another radio base station on the basis of the handover threshold included in the threshold notification response received by the device side receiver and the radio condition information acquired by the radio condition information acquisition unit.

2. The communication system according to claim 1, wherein the handover execution unit executes the handover when the condition of the radio signal indicated by the radio condition information falls below the handover threshold.

3. The communication system according to claim 1 or 2, wherein
the radio communication device executes a communication with the communication target device by using any one of a plurality of radio communication systems, and
the handover execution unit executes handover to another radio communication system on the basis of the handover threshold included in the threshold notification response and the radio condition information.

4. The communication system according to claim 1, wherein
the server side transmitter transmits a determination request for requesting to determine the handover threshold to the radio communication device,
the radio communication device comprises a threshold determination unit configured to determine the radio condition information as the handover threshold on the basis of the determination request received by the device side receiver, the radio condition information corresponding to a deteriorated condition of a quality of the application which is being executed in the radio communication device,
the device side transmitter transmits a post-determination threshold notification to the threshold management server, the post-determination threshold notification including the handover threshold determined by the threshold determination unit and the type of application which is being executed in the radio communication device, and
the storage stores the handover threshold in association with the application, on the basis of the post-determination threshold notification received by the server side receiver from the radio communication device.

5. The communication system according to claim 1 or 2, wherein
the storage stores the application, the handover threshold, and traffic information in association with one another, the traffic information indicating a condition of traffic handled in a radio communication system,
the threshold management server includes a traffic acquisition unit configured to acquire the traffic information, and
the server side transmitter transmits a threshold notification response to the radio communication device on the basis of the type of application included in the execution notification and the condition of traffic included in the traffic information acquired by the traffic acquisition unit, the threshold notification response including any one of handover thresholds stored in the storage.

6. The communication system according to claim 4, wherein
the threshold management server comprises a traffic acquisition unit configured to acquire traffic information indicating a condition of traffic handled in a radio communication system,
the server side transmitter transmits the determination request to the radio communication device when the traffic acquisition unit acquires the traffic information,
the storage stores the application, the handover threshold, and the condition of traffic in association with one another on the basis of the post-determination threshold notification corresponding to the determination request transmitted when the traffic information is acquired, and
the server side transmitter transmits a threshold notification response to the radio communication device on the basis of the type of application included in the execution notification and the condition of traffic included in the traffic information acquired by the traffic acquisition unit, the threshold notification response including any one of handover thresholds stored in the storage.

7. A threshold management server managing a handover threshold corresponding to an application executed in a radio communication device executing a communication with a communication target device through a radio base station, the threshold management server comprising:
- a server side receiver configured to receive an execution notification from the radio communication device, the execution notification including a type of the application executed in the radio communication device;
- a storage configured to store the handover threshold in association with the application; and
- a server side transmitter configured to transmit a threshold notification response to the radio communication device on the basis of the execution notification received by the server side receiver, the threshold notification response including the handover threshold stored in the storage.

8. The threshold management server according to claim 7, wherein the server side transmitter transmits a determination request for requesting to determine the handover threshold to the radio communication device.

9. The threshold management server according to claim 7, wherein
the radio communication device determines the radio condition information as the handover threshold, the radio condition information corresponding to a deteriorated condition of a quality of the application which is being executed in the radio communication device,
the server side receiver receives, from the radio communication device, a post-determination threshold notification including the handover threshold determined in the radio communication device and the type of application which is being executed in the radio communication device, and the storage stores the handover threshold in association with the application on the basis of the post-determination threshold notification received by the server side receiver.

10. The threshold management server according to claim 7 or 8, wherein the storage stores the application, the handover threshold, and traffic information in association with one another, the traffic information indicating a condition of traffic handled in a radio communication system, the threshold management server further comprising a traffic acquisition unit configured to acquire the traffic information, wherein the server side transmitter transmits a threshold notification response to the radio communication device, on the basis of the type of application included in the execution notification and the condition of traffic included in the traffic information acquired by the traffic acquisition unit, the threshold notification response including any one of handover thresholds stored in the storage.

11. The threshold management server according to claim 9, further comprising a traffic acquisition unit configured to acquire traffic information indicating a condition of traffic handled in the radio communication system, wherein the server side transmitter transmits the determination request to the radio communication device when the traffic acquisition unit acquires the traffic information, the storage stores the application, the handover threshold, and the condition of traffic in association with one another on the basis of the post-determination threshold notification corresponding to the determination request transmitted when the traffic information is acquired, and the server side transmitter transmits a threshold notification response to the radio communication device on the basis of the type of application included in the execution notification and the condition of traffic included in the traffic information acquired by the traffic acquisition unit, the threshold notification response including any one of handover thresholds stored in the storage.

12. A radio communication device which executes an application and executes a communication with a communication target device through a radio base station, the radio communication device comprising:

a device side transmitter configured to transmit an execution notification to a threshold management server managing a handover threshold, the execution notification including a type of the application executed in the radio communication device;

a device side receiver configured to receive, from the threshold management server, a threshold notification response including the handover threshold;

a radio condition information acquisition unit configured to acquire radio condition information indicating a condition of a radio signal which is transmitted to or received from the radio base station; and a handover execution unit configured to execute handover to another radio base station on the basis of the handover threshold included in the threshold notification response received by the device side receiver and the radio condition information acquired by the radio condition information acquisition unit.

13. The radio communication device according to claim 12, wherein the handover execution unit executes the handover when the condition of the radio signal indicated by the radio condition information falls below the handover threshold.

14. The radio communication device according to claim 12 or 13, wherein the radio communication device executes a communication with the communication target device by using any one of a plurality of radio communication systems, and the handover execution unit executes handover to another radio communication system on the basis of the handover threshold included in the threshold notification response and the radio condition information.

15. A communication method for executing a communication on the basis of a handover threshold corresponding to an application executed in a radio communication device executing a communication with a communication target device through a radio base station, the communication method comprising the steps of:

transmitting, at the radio communication device, an execution notification including a type of the application executed in the radio communication device;

transmitting a threshold notification response including the handover threshold to the radio communication device on the basis of the received execution notification;

acquiring, at the radio communication device, radio condition information indicating a condition of a radio signal which is transmitted to or received from the radio base station;

executing, at the radio communication device, handover to another radio base station on the basis of the handover threshold included in the threshold notification response received by the radio communication device and the radio condition information acquired by the radio communication device.

16. The communication system according to claim 2, wherein the server side transmitter transmits a determination request for requesting to determine the handover threshold to the radio communication device, the radio communication device comprises a threshold determination unit configured to determine the radio condition information as the handover threshold on the basis of the determination request received by the device side receiver, the radio condition information corresponding to a deteriorated condition of a quality of the application which is being executed in the radio communication device, the device side transmitter transmits a post-determination threshold notification to the threshold management server, the post-determination threshold notification including the handover threshold determined by the threshold determination unit and the type of application which is being executed in the radio communication device, and the storage stores the handover threshold in association with the application, on the basis of the post-determination threshold notification received by the server side receiver from the radio communication device.

17. The communication system according to claim 16, wherein the threshold management server comprises a traffic acquisition unit configured to acquire traffic information indicating a condition of traffic handled in a radio communication system, the server side transmitter transmits the determination request to the radio communication device when the traffic acquisition unit acquires the traffic information, the storage stores the application, the handover threshold, and the condition of traffic in association with one another on the basis of the post-determination threshold notification corresponding to the determination request transmitted when the traffic information is acquired, and the server side transmitter transmits a threshold notification response to the radio communication device on the basis of the type of application included in the execution notification and the condition of traffic included in the traffic information acquired by the traffic acquisition unit, the threshold notification response including any one of handover thresholds stored in the storage.

18. The threshold management server according to claim 8, wherein the radio communication device determines the radio condition information as the handover threshold, the radio condition information corresponding to a deteriorated condition of a quality of the application which is being executed in the radio communication device, the server side receiver receives, from the radio communication device, a post-determination threshold notification including the handover threshold determined in the radio communication device and the type of application which is being executed in the radio communication device, and the storage stores the handover threshold in association with the application on the basis of the post-determination threshold notification received by the server side receiver.

19. The threshold management server according to claim 18, further comprising a traffic acquisition unit configured to acquire traffic information indicating a condition of traffic handled in the radio communication system, wherein the server side transmitter transmits the determination request to the radio communication device when the traffic acquisition unit acquires the traffic information, the storage stores the application, the handover threshold, and the condition of traffic in association with one another on the basis of the post-determination threshold notification corresponding to the determination request transmitted when the traffic information is acquired, and the server side transmitter transmits a threshold notification response to the radio communication device on the basis of the type of application included in the execution notification and the condition of traffic included in the traffic information acquired by the traffic acquisition unit, the threshold notification response including any one of handover thresholds stored in the storage.

\* \* \* \* \*